UNITED STATES PATENT OFFICE.

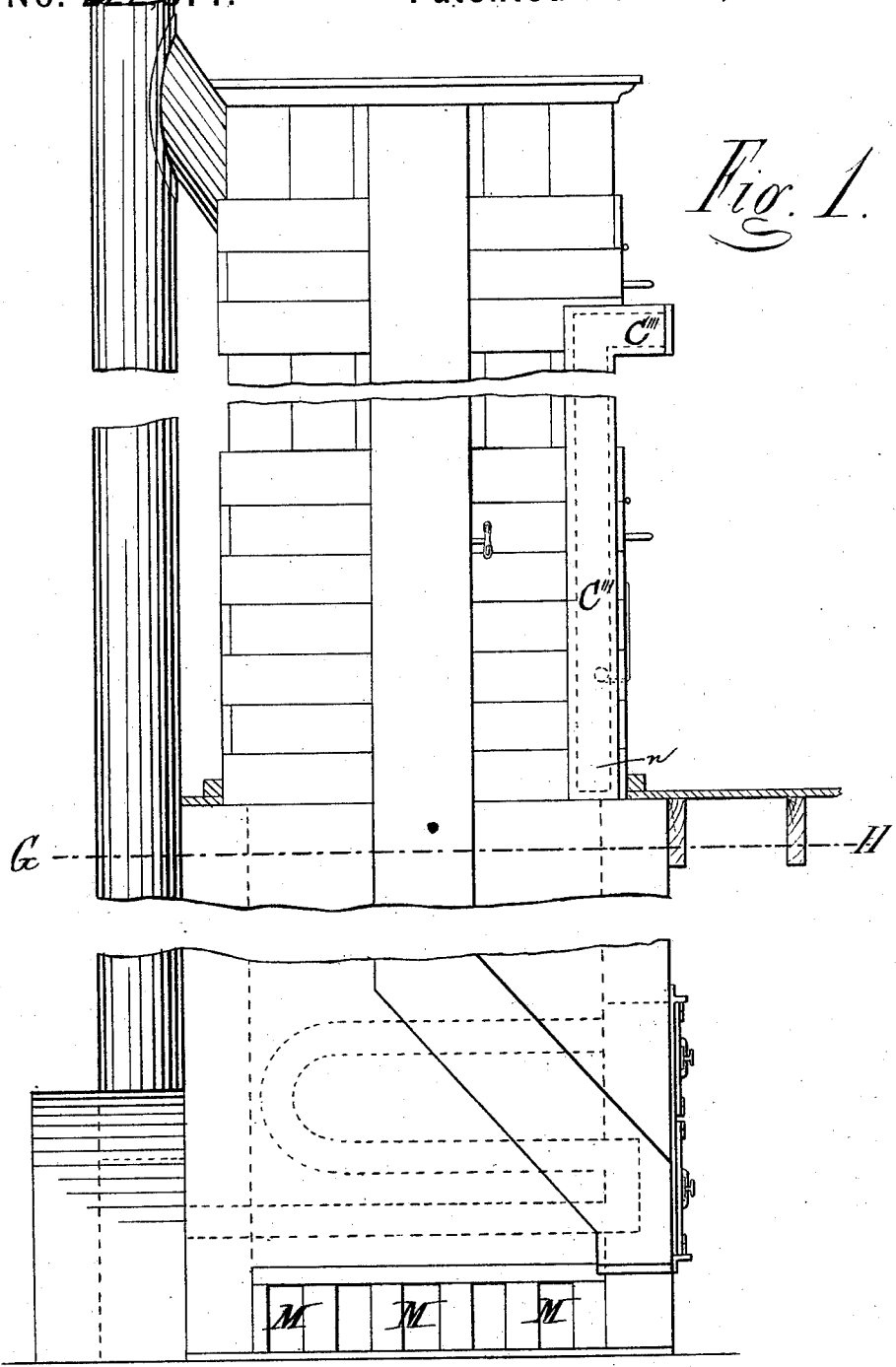

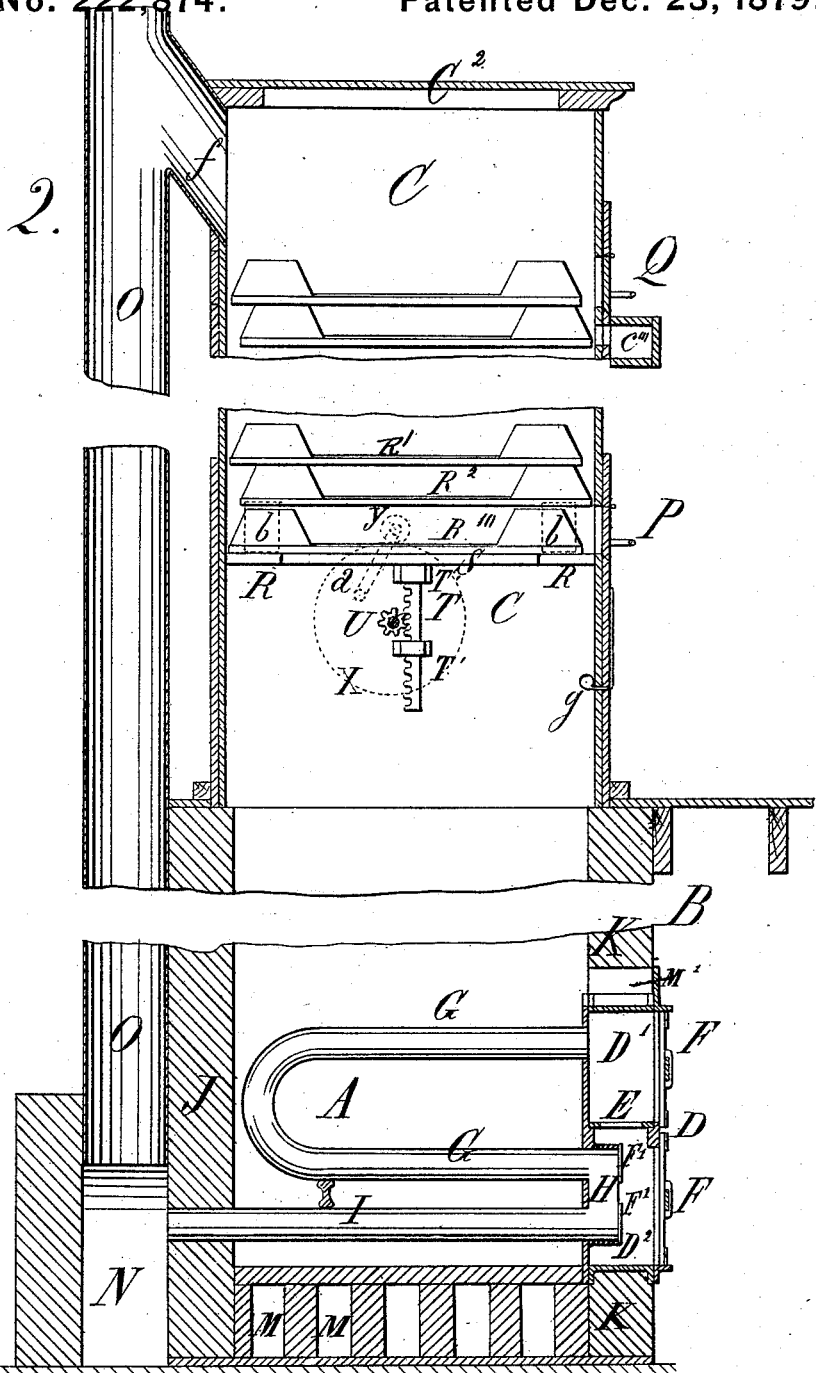

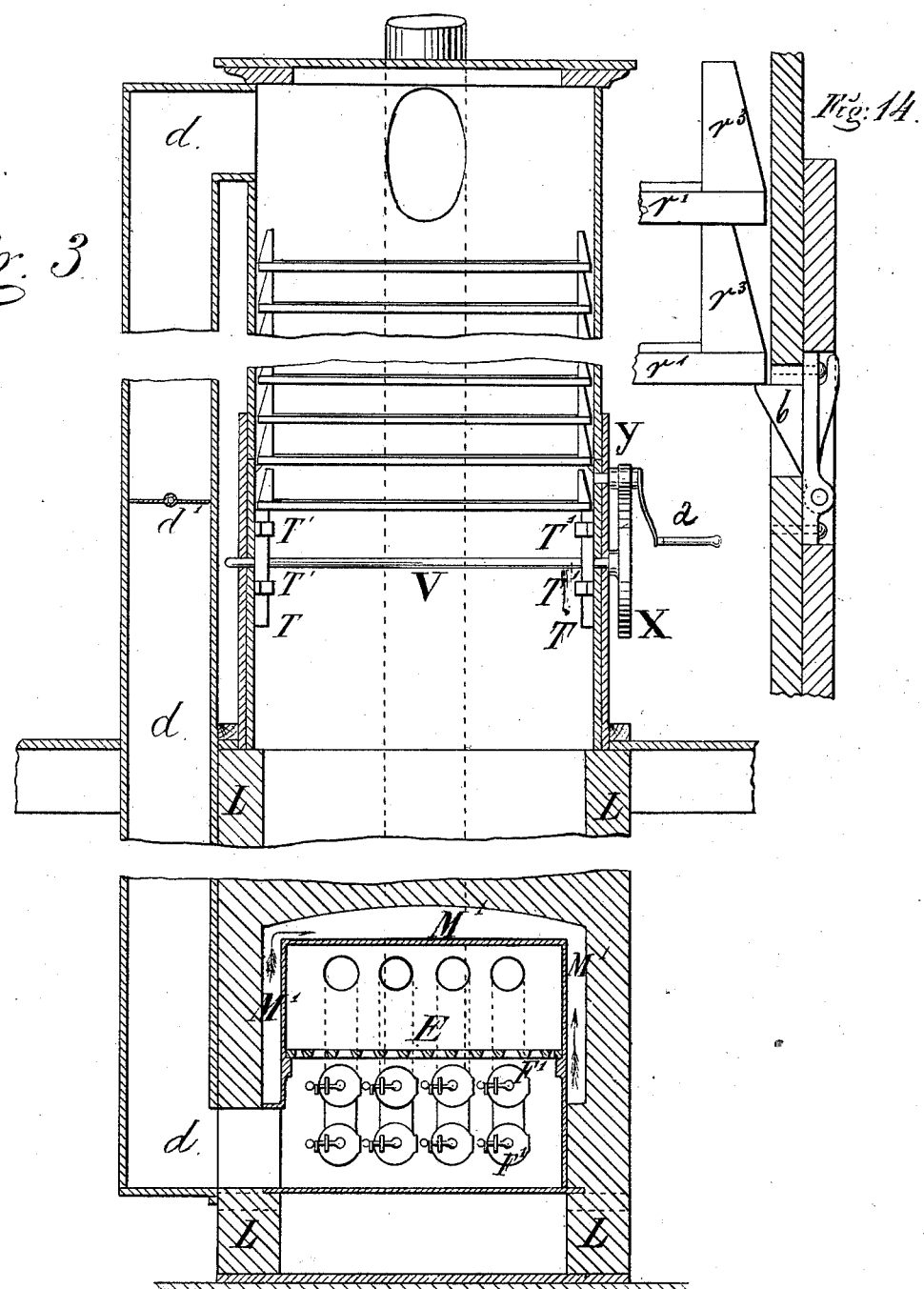

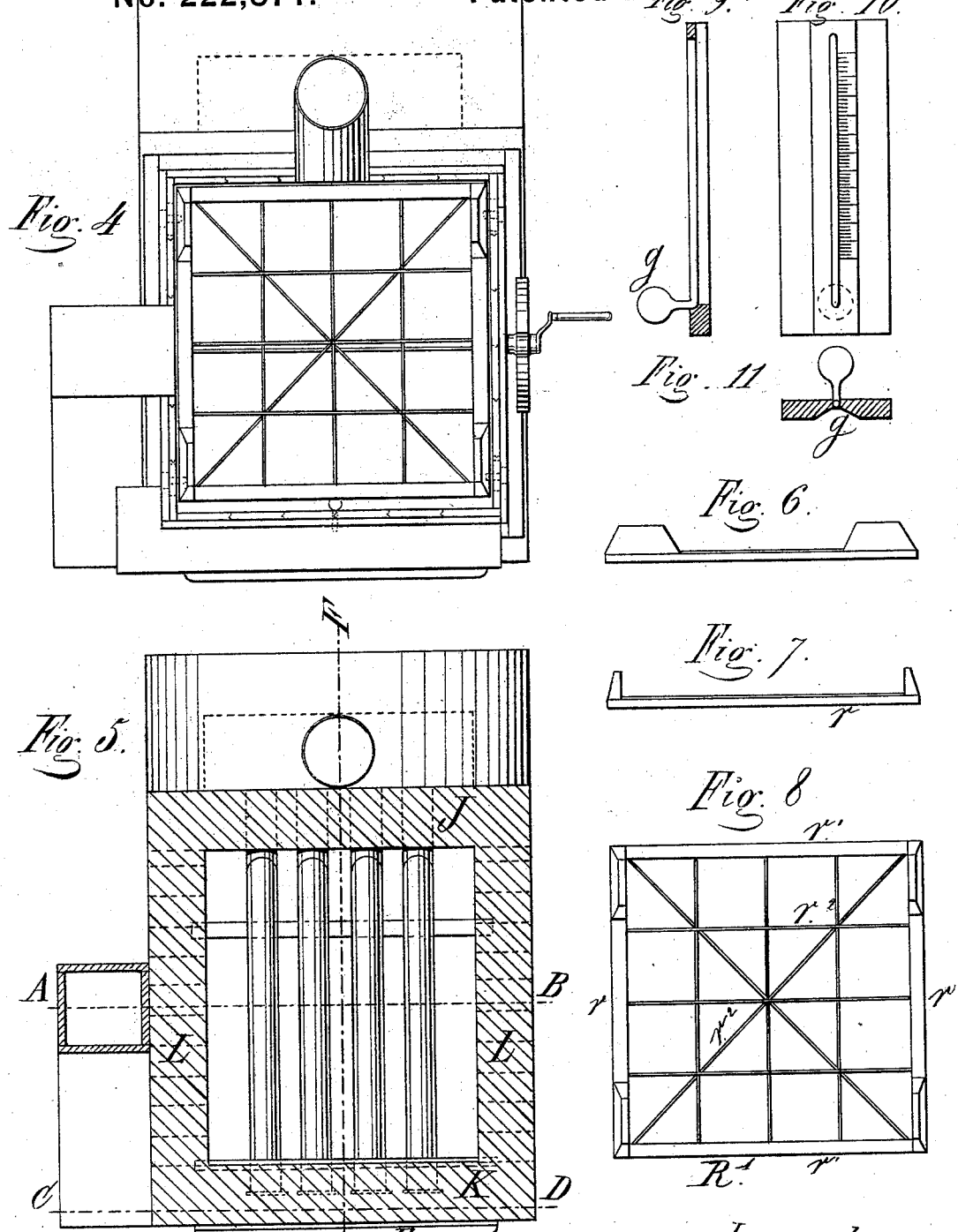

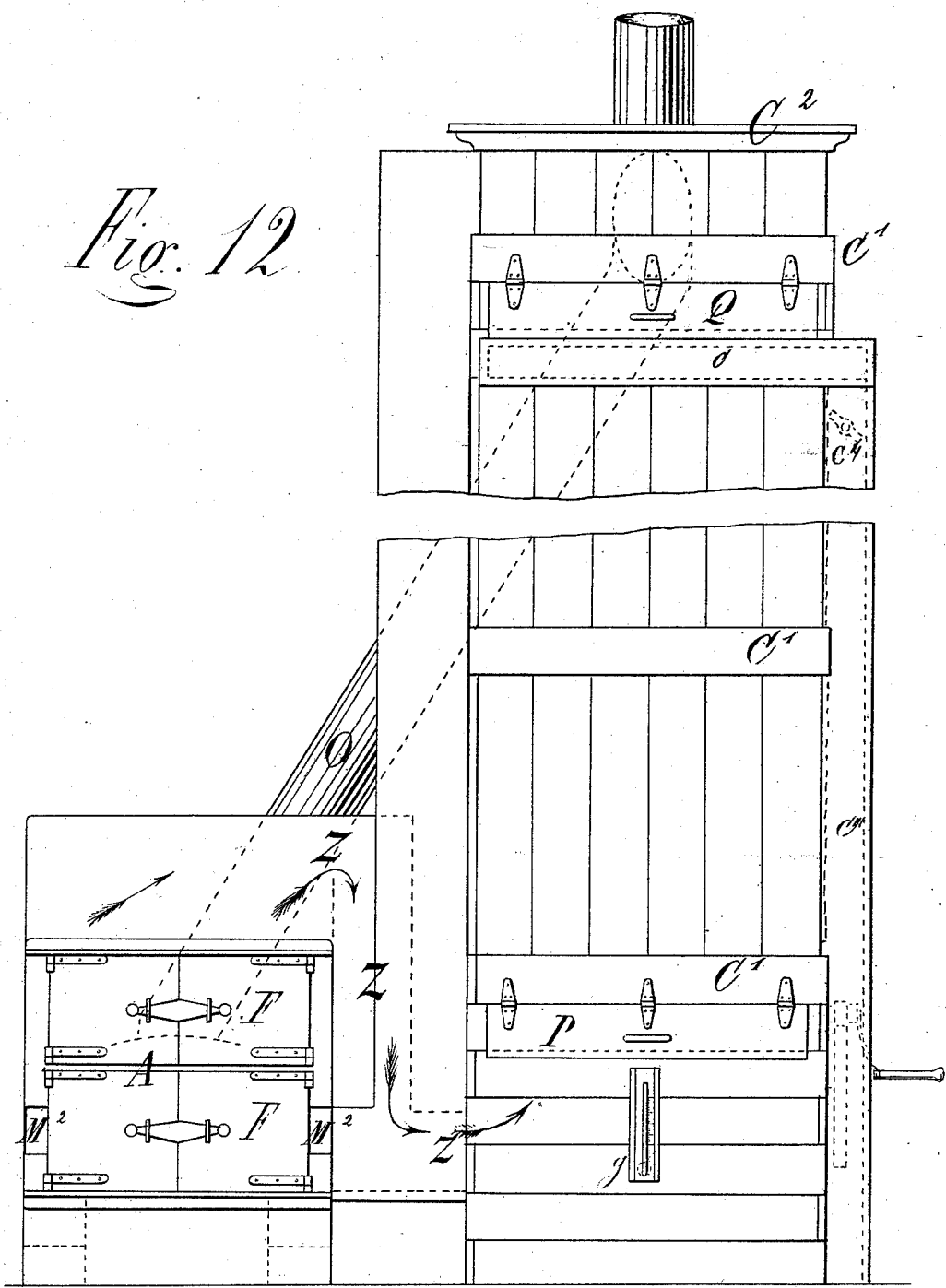

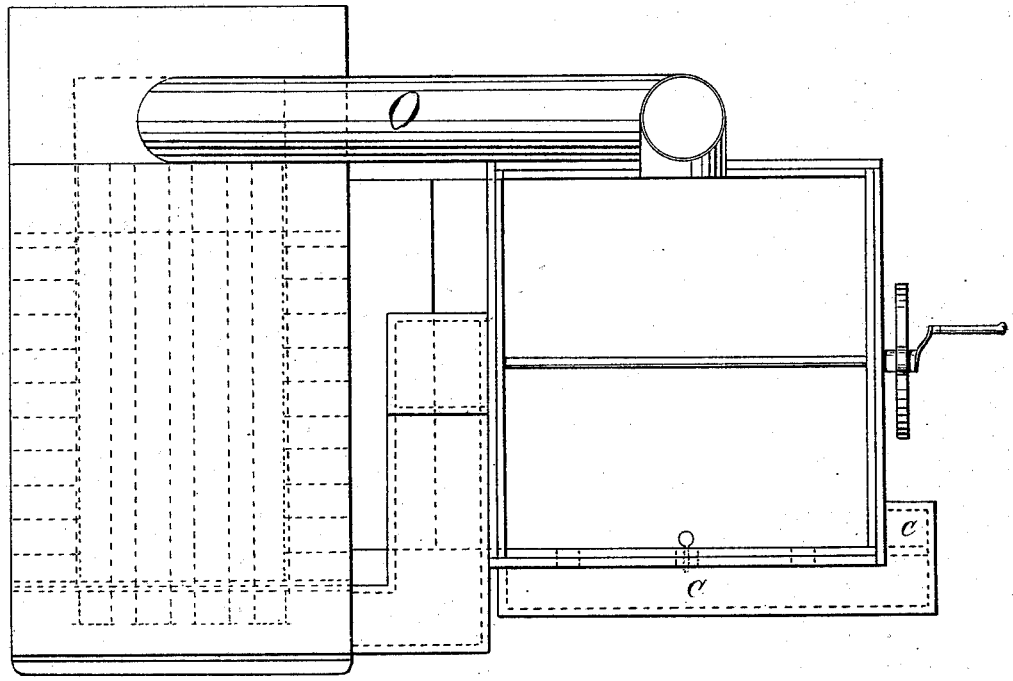

GEORGE W. DEITZLER, OF SAN FRANCISCO, CALIFORNIA.

IMPROVEMENT IN FRUIT-DRIERS.

Specification forming part of Letters Patent No. 222,874, dated December 23, 1879; application filed January 31, 1879.

*To all whom it may concern:*

Be it known that I, GEORGE W. DEITZLER, of the city and county of San Francisco, and State of California, have invented certain novel Improvements in the Construction of Air-Heating Furnaces, in the application of said furnaces to the evaporation of the moisture from vegetable and other substances, and the warming and ventilation of apartments, and also in a method of supplying the combustion in the fire-box with air taken from the top of the evaporating-chamber, or from near the floor of apartments, as will be hereinafter more fully described.

The following is a clear and exact description of my invention, reference being had to the annexed drawings, in which—

Figure 1 shows a side elevation of the furnace and evaporating-chamber. Fig. 2 is a sectional elevation of the same through line E F in Fig. 5. Fig. 3 shows a sectional elevation of the furnace and evaporating-chamber through line A B in Fig. 5. Fig. 4 is a top view of the apparatus with the cover removed. Fig. 5 is a cross-section of the furnace through line G H in Fig. 1. Figs. 6, 7, and 8 show different views of the frames. Figs. 9, 10, and 11 are views of the thermometer. Fig. 12 is a front elevation of a modification of the furnace and evaporating-chamber. Fig. 13 is a top view of the furnace and the evaporating-chamber, arranged as in Fig. 12; and Fig. 14 shows more in detail the adjustment of the pawls upon which the frames are supported in the evaporating-chamber.

As seen in Fig. 2, the structure is here used for the evaporation of moisture from vegetable or other substances, and is essentially composed of an air-heating furnace, A, inclosed in a brick wall, B, on top of which is placed a vertical shaft or evaporating-chamber, C.

The body of the furnace is a cast-iron box, D, provided with the grate-bars E and doors F F. The box D is divided into two parts, the grate-bars E separating the fire-box D' from the ash-box D². The U-shaped pipes G are fastened to the back of the box D at two points, one above and the other below the grate-bars, into the recesses H, cast for that purpose. The pipes I are attached to the lower part of the ash-box D², and fit into the recesses H, and the other ends are embedded into the rear wall J. The box D is set into the front wall, K. The side walls, L, complete the inclosure of the furnace. The walls L are provided at the lower part with cold-air openings, M', and a sliding register to regulate the supply of air to be heated.

On the sides and top of the fire-box D' I leave an air-space, which space is supplied with cold air through the openings M², Fig. 12, on each side of the box D. This arrangement secures a large radiating or air-heating surface, and also tends to prevent the burning out of the cast-iron of the box D.

The smoke-box N is built of brick in the rear of the wall J, and the smoke-stack O rises vertically from the top of the arch.

The shaft or evaporating-chamber C is made of flooring running vertically, secured at the corners by nails or screws, and strengthened by means of horizontal braces C' placed at the top of the feed and discharge doors, and also at suitable intermediate points. The top of the shaft is closed by means of the cover C².

The feed-door P is placed on the front of the evaporating-chamber, about thirty inches above the first floor of the building, or the top of the walls inclosing the furnace, and is used to introduce the fruit-loaded frames R' R'' into the evaporating-chamber.

The discharge-door Q is placed at any desired distance, usually about twelve feet above the feed-door, and is used to remove the frames from the evaporating-chamber. These doors are hung by means of strap-hinges at the top, and closed at the bottom by means of a button. On a level with the lower part of the feed-door P, and on each side of the evaporating-chamber, I nail two cleats, R R, for the purpose of guiding the frame R' to its place in the evaporating-chamber.

The hoisting apparatus consists of two racks, T, which are placed inside on the center line of the sides of the evaporating-chamber, below the feed-door, so that the top of the horizontal bar S, when at rest, shall be on a level with the bottom of the feed-door and the cleats R R.

Both racks are driven by the pinions U, keyed on a common shaft, V, extending across the evaporating-chamber. On the right-hand side of the shaft V is fastened a gear, X, led by a pinion, Y, and crank *a*.

The pawls $b$ are set inside on the sides of the evaporating-chamber, about four inches from the corners, so that the tops are about five and a half inches above the bottom of the feed-door. The castings which hold the pawls are set into the walls, Figs. 3 and 14, so that only the pawls project into the evaporating-chamber about half an inch.

The horizontal bar S, being down and at rest, the first frame R', loaded with fruit, is pushed in on the cleats and bar, until it reaches the back wall of the chamber. The crank $a$ is then turned so as to raise the rack, with the frame, about five and a half inches. The pawls catch and hold the frame, and the rack is turned down to its original place. Then frame R''' is inserted in the same manner as R'', and so on till the chamber is filled. The next frame, R'', is then pushed in on the bar, so as to rest against the front wall, which will leave it two inches from the back wall of the evaporating-chamber.

By this method a space of two inches is left between the back and front walls and the ends of the frames, alternately, as shown in the drawings, thus giving to the heated air a zigzag course over the fruit-loaded frames, in its ascent through the chamber.

A current of hot air is taken from the evaporating-chamber immediately above the brick wall, and led up into the evaporating-chamber, just below the discharge-door, through the flue C''' C'''.

The flue C''' is placed outside and against the wall of the evaporating-chamber, and the hot air in it may be admitted into the evaporating-chamber at intermediate points between the feed and discharge doors, through openings in the walls of the chamber, which openings may be provided with regulating-dampers $C^4$, and the object is to assist in forcing up and carrying away any moisture which might otherwise condense in and fall back upon the frames in the upper part of the evaporating-chamber.

The smoke-stack O is in communication with the top of the evaporating-chamber by means of the short flue $f$.

By the above-described system of flues the warm and moist air which has passed over and through the frames in the evaporating-chamber is carried off in two directions—one up the smoke-stack O through the flue $f$, and the other to the combustion-chamber D through the flue $d\ d$, thus creating a partial vacuum at the top of the evaporating-chamber, and, as a consequence, causing a very rapid current of the hot air over and through the frames in the evaporating-chamber, a condition absolutely essential to the attainment of the greatest perfection in the art of fruit preservation by pneumatic evaporation. The flue $d\ d$ also supplies the combustion-chamber with air already heated, which effects a saving in fuel.

A thermometer, $g$, is set into the wall of the evaporator under the feed-door P, with its bulb inside and its stem and scale outside, as seen in Figs. 2, 9, and 10, so as to ascertain easily the temperature of the air in the shaft.

The pipes G and I are provided with doors F' in the box $D^2$, for the purpose of cleaning said pipes. They are placed close together, and the air, after it has entered at the openings M, comes first in contact with the moderately-heated pipes I, and then rises, successively, to the second and third systems of pipes, (the upper tier being the hottest,) thus passing over and in close contact with the heated pipes, the object being to heat the air by degrees by filtering it through the narrow spaces between (which brings every atom of the air in actual contact with) the heated pipes, which is much more effective than the old methods of heating air by radiation.

The frames R' are composed of four sides, $r\ r'$, nailed at the corners.

The wires $r^2$ are stretched across the bottom of the frames for the purpose of supporting the net on which the fruit is spread. The corners are provided with supports $r^3$, as shown in Figs. 6, 7, 8, and 14. These cleats serve to keep the required distance between and to support the frames.

In fruit-drying establishments the furnace may be located on the same floor with the feed-door of the evaporator, as shown in Figs. 12 and 13, instead of underneath, as described above. In that case the hot air, instead of following a direct upward course, is let down again to a place in the shaft under the feed-door by means of the channel Z, as shown by the arrows in Fig. 12.

Having thus described my invention, what I claim as new, and desire to secure by Letters Patent, is—

1. An air-heating furnace composed of the combination of the box D, provided with the grate-bars E, doors F and F', recesses H, with the pipes G and I, inclosing-walls J K L, having the cold-air openings M' $M^2$, smoke-box N, and stack O, as described and specified.

2. In an apparatus for evaporating the moisture from vegetable and other substances, the combination of the hoisting machinery composed of the crank $a$, pinion Y, gear X, pinions U, and racks T, provided with the horizontal bars S and guides T', with the pawls $b$, frames R', and evaporating chamber C, as described and specified.

3. In an apparatus for evaporating the moisture from vegetable and other substances, the combination of the flues $d$, $f$, and C''', the evaporating-chamber C, and the air-heating furnace A, as described, and for the purpose specified.

GEO. W. DEITZLER.

Witnesses:
 GEO. H. STRONG,
 WILLIAM D. SMITH.